(12) United States Patent
Kimsey

(10) Patent No.: US 12,736,195 B2
(45) Date of Patent: Sep. 15, 2026

(54) VEHICULAR ILLUMINATION MODULE

(71) Applicant: Magna Mirrors of America, Inc., Holland, MI (US)

(72) Inventor: Christopher J. Kimsey, Middleville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 19/081,017

(22) Filed: Mar. 17, 2025

(65) Prior Publication Data

US 2025/0297714 A1 Sep. 25, 2025

Related U.S. Application Data

(60) Provisional application No. 63/567,994, filed on Mar. 21, 2024.

(51) Int. Cl.

| | |
|---|---|
| ***B60Q 1/24*** | (2006.01) |
| ***F21S 41/148*** | (2018.01) |
| ***F21S 41/151*** | (2018.01) |
| ***F21S 41/36*** | (2018.01) |
| *F21W 102/17* | (2018.01) |
| *F21Y 103/10* | (2016.01) |
| *F21Y 115/10* | (2016.01) |

(52) U.S. Cl.
CPC ............ *F21S 41/148* (2018.01); *B60Q 1/247* (2022.05); *F21S 41/151* (2018.01); *F21S 41/36* (2018.01); *F21W 2102/17* (2018.01); *F21Y 2103/10* (2016.08); *F21Y 2115/10* (2016.08)

(58) Field of Classification Search
CPC ........ F21S 41/148; F21S 41/151; F21S 43/14; F21Y 2103/10; F21Y 2115/10; B60Q 1/247; B60Q 2400/40; B60Q 2400/50; F21W 2103/60
See application file for complete search history.

(56) References Cited

U.S. PATENT DOCUMENTS

| | | | | |
|---|---|---|---|---|
| 5,371,659 A | | 12/1994 | Pastrick et al. | |
| 5,497,305 A | | 3/1996 | Pastrick et al. | |
| 5,669,699 A | | 9/1997 | Pastrick et al. | |
| 5,823,654 A | | 10/1998 | Pastrick et al. | |
| 6,130,514 A | * | 10/2000 | Oesterholt .............. | B60R 1/074 359/872 |

(Continued)

OTHER PUBLICATIONS

National Highway traffic safety administration (Year: 2011).*

*Primary Examiner* — Omar Rojas Cadima
(74) *Attorney, Agent, or Firm* — HONIGMAN LLP

(57) ABSTRACT

A vehicular illumination module includes a housing disposed at an exterior portion of a vehicle. A printed circuit board (PCB) is accommodated by the housing and includes a first facing a first direction and a second side facing an opposite second direction. A light source is disposed at the second side and is operable to emit light in the second direction. A reflector is accommodated by the housing and includes an optic portion including a freeform curvature. The housing has an aperture at the optic portion. The light source emits light that passes through the aperture and the optic portion reflects the emitted light to illuminate a region exterior of the vehicle. A primary axis of illumination of the reflected light reflected is in a third direction transverse to the first direction and the second direction.

22 Claims, 9 Drawing Sheets

(56) References Cited

U.S. PATENT DOCUMENTS

| | | | | |
|---|---|---|---|---|
| 6,349,450 | B1 | 2/2002 | Koops et al. | |
| 6,550,103 | B2 | 4/2003 | Koops et al. | |
| 7,815,348 | B2 | 10/2010 | Pastrick | |
| 8,333,492 | B2 | 12/2012 | Dingman et al. | |
| 8,764,256 | B2 | 7/2014 | Foote et al. | |
| 8,801,245 | B2 | 8/2014 | De Wind et al. | |
| 8,914,437 | B2 | 12/2014 | Bhogal et al. | |
| 8,915,601 | B2 | 12/2014 | Foote et al. | |
| 9,346,403 | B2 | 5/2016 | Uken et al. | |
| 9,487,142 | B2 | 11/2016 | Sobecki et al. | |
| 9,827,913 | B2 | 11/2017 | De Wind et al. | |
| 10,099,618 | B2 | 10/2018 | Foote et al. | |
| 10,576,896 | B2 | 3/2020 | Huizen et al. | |
| 10,744,930 | B2 | 8/2020 | Sobecki et al. | |
| 10,906,463 | B2 | 2/2021 | Pflug et al. | |
| 11,167,688 | B2 | 11/2021 | Huizen et al. | |
| 11,235,699 | B2 | 2/2022 | Sobecki et al. | |
| 11,325,535 | B2 | 5/2022 | Foote et al. | |
| 11,351,919 | B2 | 6/2022 | Esser | |
| 11,597,321 | B2 | 3/2023 | Huizen et al. | |
| 12,049,171 | B2 | 7/2024 | Huizen et al. | |
| 12,071,074 | B2 | 8/2024 | Esser | |
| 12,157,414 | B2 | 12/2024 | Baur | |
| 2008/0309510 | A1* | 12/2008 | Mandagaran | B60R 1/1207 340/815.45 |
| 2011/0157907 | A1* | 6/2011 | Hwang | B60R 1/1207 362/494 |
| 2012/0081915 | A1* | 4/2012 | Foote | B60Q 1/2696 362/494 |
| 2015/0224919 | A1 | 8/2015 | Sobecki et al. | |
| 2023/0009664 | A1 | 1/2023 | Esser et al. | |
| 2024/0367581 | A1 | 11/2024 | Sobecki | |
| 2024/0367585 | A1 | 11/2024 | Peterson et al. | |

* cited by examiner

VEHICULAR ILLUMINATION MODULE

CROSS REFERENCE TO RELATED APPLICATION

The present application claims the filing benefits of U.S. provisional application Ser. No. 63/567,994, filed Mar. 21, 2024, which is hereby incorporated herein by reference in its entirety.

FIELD OF THE INVENTION

The present invention relates to illumination modules for vehicles and, more particularly, to an illumination module that projects an icon or image onto a surface at or near the vehicle.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

A vehicular illumination module includes a housing configured to mount at an exterior portion of a vehicle equipped with the vehicular illumination module, such as at an exterior rearview mirror assembly or a door handle assembly. A printed circuit board (PCB) or printed circuit board (PCB) is accommodated by the housing and includes a first side and a second side opposite the first side. With the housing mounted at the exterior portion of the vehicle, the first side of the PCB faces a first direction (e.g., upwards) and the second side of the PCB faces a second direction opposite the first direction (e.g., downwards). The PCB accommodates a light source, such as a light emitting diode (LED) at the second side of the PCB and that is electrically operable to emit light in the second direction. A reflector is accommodated by the housing and includes an optic portion. The optic portion includes a freeform curvature. An aperture is formed through the housing at or near the optic portion. With the housing mounted at the exterior portion of the vehicle, and when the light source is electrically operated to emit light, the light source emits light that passes through the aperture and the optic portion of the reflector reflects the light emitted by the light source to illuminate a region exterior of the vehicle. A primary axis of illumination of the light reflected by the optic portion is in a third direction transverse to the first direction and the second direction.

These and other objects, advantages, purposes and features of the present invention will become apparent upon review of the following specification in conjunction with the drawings.

DESCRIPTION OF THE PREFERRED EMBODIMENTS

Figure 1:
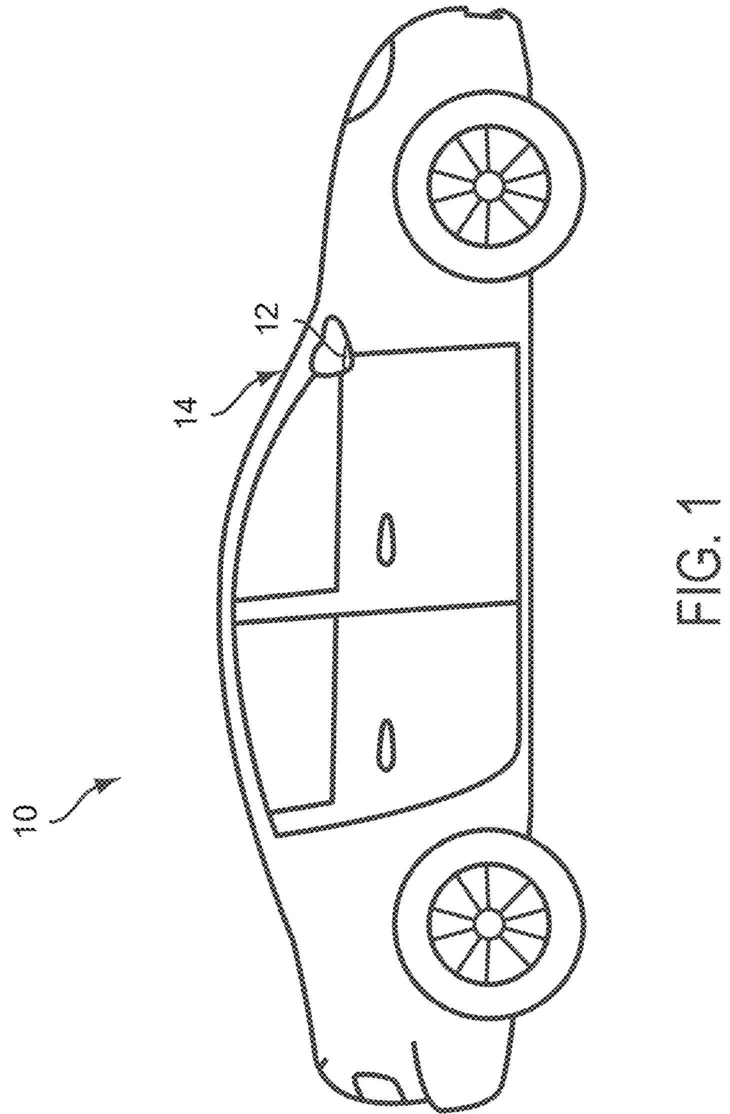
FIG. 1 is a side view of a vehicle with an illumination and projection light module at the exterior rearview mirror of the vehicle.
Figure 2:
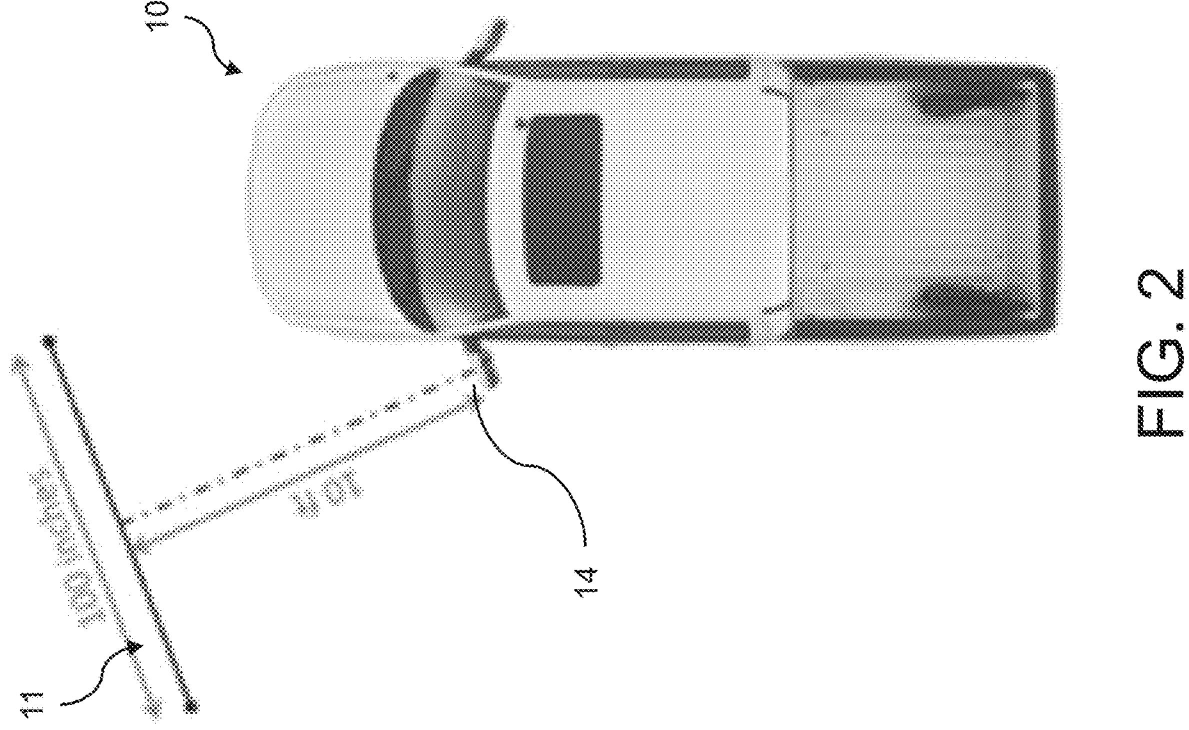
FIGS. 2 and 3 are views of the vehicle, showing an example field of illumination of light emitted by the illumination module.
Figure 3:
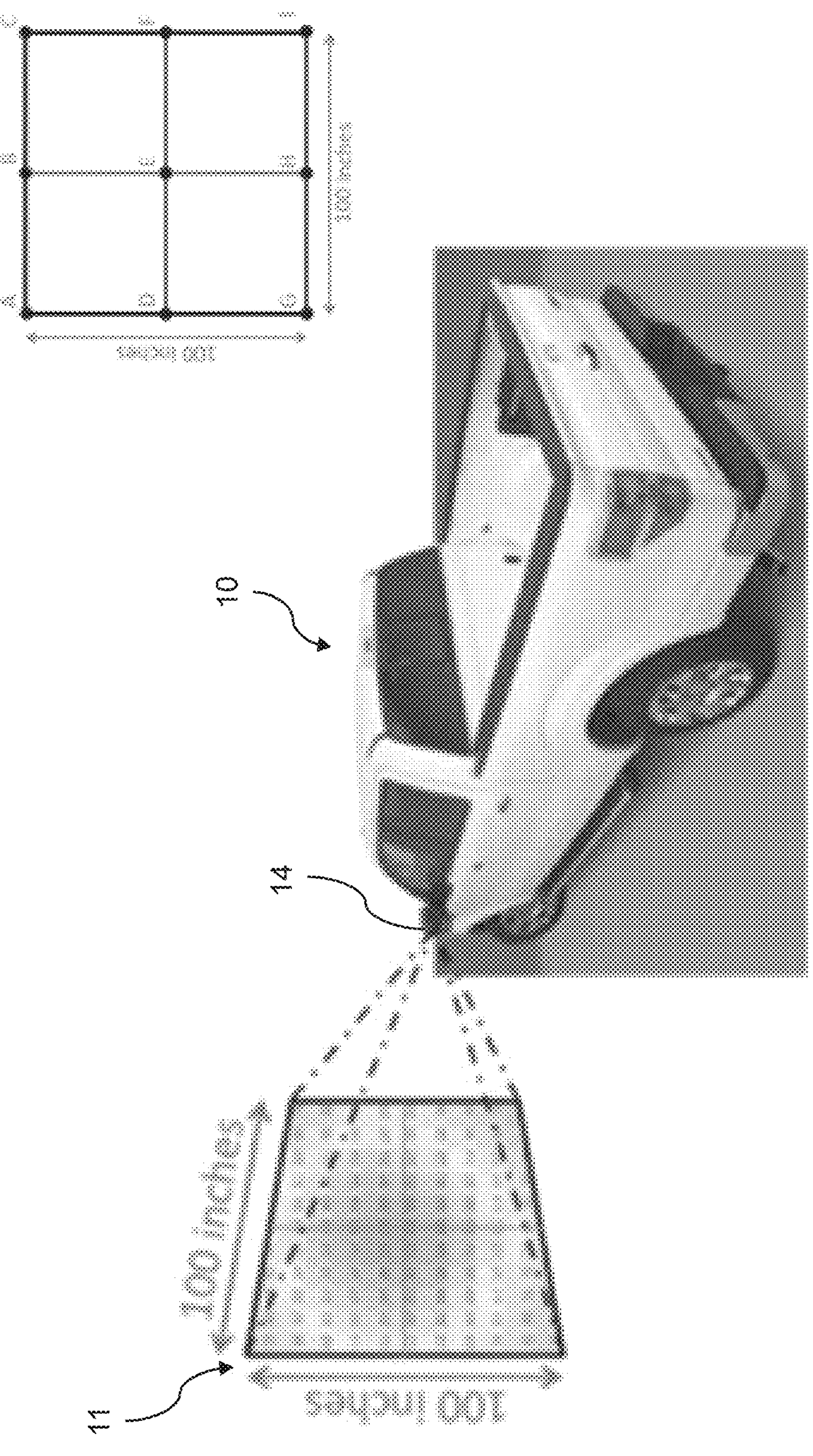
Figure 4:
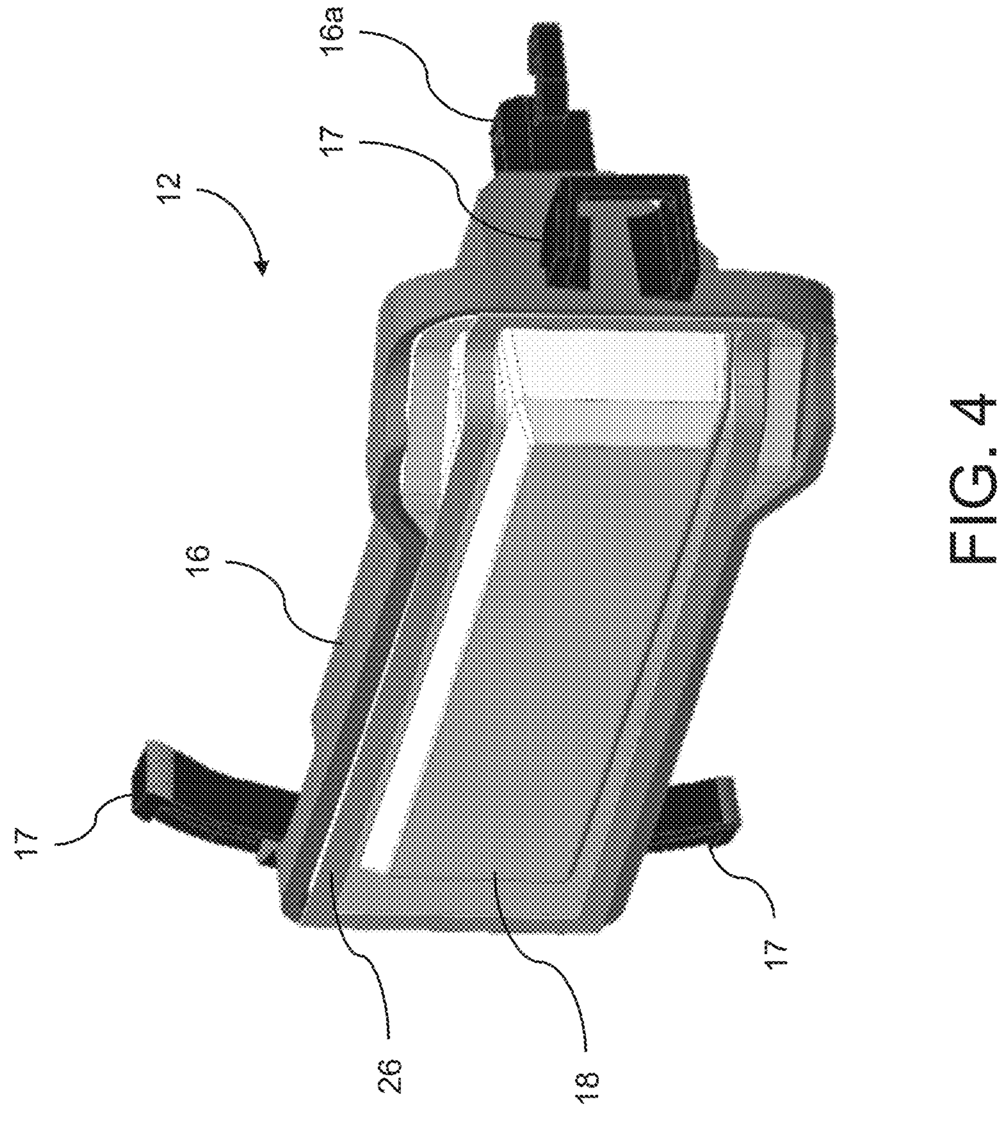
FIG. 4 is a perspective view of the illumination module.

Referring now to the drawings and the illustrative embodiments depicted therein, an illumination module 12 may be disposed at an exterior portion of a vehicle 10 and operable to provide a task light, where light is emitted from the illumination module 12 to illuminate a surface or to project an image or icon or logo or indicia onto the surface at or near the vehicle 10 (FIG. 1). For example, the illumination module 12 may be configured to project the image onto a surface forward of the vehicle 10 and/or at least partially sideward of the vehicle 10 and at a height above a ground surface, such as onto a vertical wall structure proximal the vehicle 10 (FIGS. 2 and 3). Optionally, the illumination module 12 may be operable to provide ground illumination, where the illumination module 12 emits light toward the ground surface along a side of the vehicle at which the illumination module 12 is mounted. The illumination module 12 may be disposed at an exterior portion of the vehicle 10, such as at a vehicular exterior rearview mirror assembly 14, a headlight assembly of the vehicle, a door handle assembly of the vehicle, a bumper or fascia of the vehicle, an underbody portion of the vehicle (such as below a driver or passenger side door), and the like. The illumination module may utilize aspects of the illumination modules described in U.S. Pat. Nos. 8,764,256; 8,801,245; 9,487,142; 10,576,896; 10,744,930 and/or 11,235,699 and/or U.S. Publication No. US-2015-0224919, which are hereby incorporated herein by reference in their entireties.

Referring to FIGS. 4-9, the illumination module 12 includes a housing or casing 16 that is configured to be received (and optionally snapped or otherwise secured) at or in an opening of the mirror assembly 14 (or elsewhere at the vehicle), with an outer portion or lens or cover 18 being at or generally flush with the outer surface of the mirror assembly or door handle or vehicle body portion at which the illumination module is mounted. In other words, the illumination module 12 is configured for attachment at the vehicle such that the lens or cover 18 is generally flush with or corresponds to the outer surface of the vehicle. For example, the housing 16 may include receiving portions 17 configured to receive tabs or connectors at a portion of the mirror assembly 14 for mounting the illumination module at the mirror assembly 14. The housing 16 includes a connector portion **16*a* configured to receive an electrical connector when the illumination module 12 is received at the mirror assembly 14 for electrically connecting the illumination module 12 to a power source of the vehicle 10**.

A printed circuit board assembly (PCBA) 20 is accommodated within the housing 16 and includes one or more light sources. In the illustrated example, the PCBA 20 accommodates three light emitting diodes (LEDs) 22 that emit white light when electrically energized. A reflector 24, such as a polycarbonate/acrylonitrile butadiene styrene (PC/ABS) reflector having an aluminized reflective surface finish, is disposed between the PCBA 20 and the lens 18 for directing the light emitted by the LEDs 22 toward the lens 18 and forward of the vehicle for illuminating the surface. For example, the PCBA 20 may be received at an upper portion of the casing 16 such that a first side or upper surface 20*a* of the PCBA 20 faces an upper inner surface of the casing 16. The LEDs 22 are disposed at a second side or lower surface 20*b* of the PCBA 20 that is opposite the upper surface 20*a*. In other words, with the illumination module 12 disposed at the exterior rearview mirror assembly and the exterior rearview mirror assembly mounted at a side of a vehicle, the PCBA 20 may be oriented horizontally (with the upper surface 20*a* facing generally upward and the lower surface 20*b* facing generally downward).

An adhesive element 26, such as a foam tape, is disposed at an outer surface of the lens 18, such as for adhesively attaching the illumination module 12 to the rearview mirror assembly 14 (e.g., to an inner surface of a housing of the rearview mirror assembly circumscribing an aperture at which the lens is exposed). For example, the illumination module 12 may be installed at an interior portion of the mirror assembly 14 such that the receiving portions 17 engage tabs at the interior portion of the mirror assembly 14 and the adhesive element 26 is pressed into engagement with the inner surface of the mirror housing to align and secure the lens 18 with the aperture formed through the mirror housing.

Optionally, the lens 18 may be at least partially tinted or darkened or non-transmissive to visible light to render the illumination module 12 covert at the exterior portion of the vehicle. For example, the illumination module 12 may be disposed at a black exterior rearview mirror head and the lens 18 may be flush with the outer surface of the mirror head and at least partially tinted to hide the illumination module 12 when not being operated. The lens 18 may be at least partially transmissive to visible light so that, when the illumination module 12 is operated, at least part of the light emitted by the illumination module passes through the lens 18 to illuminate the region near the vehicle.

Figure 5:
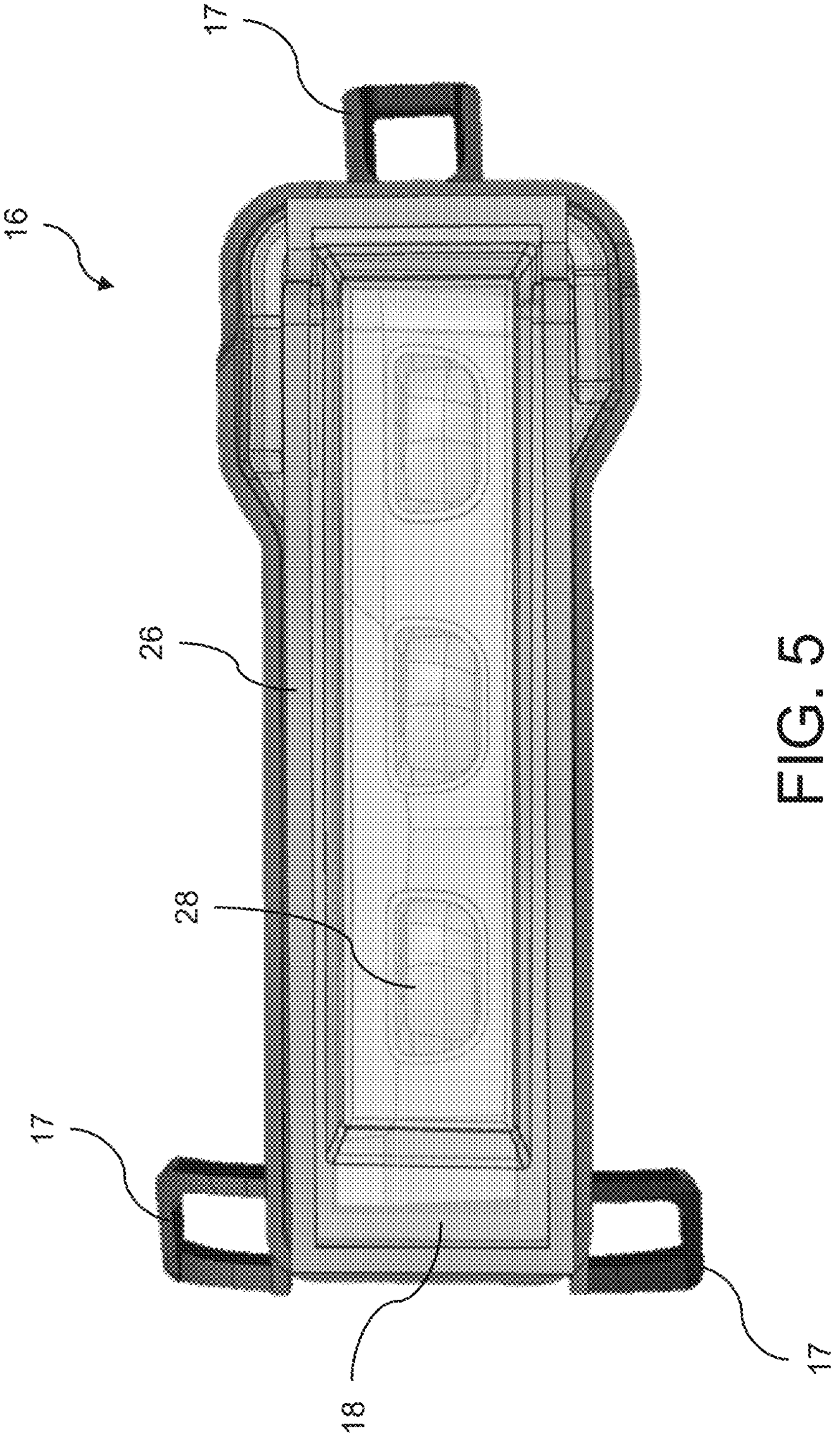
FIG. 5 is a front side view of the illumination module, demonstrating that light emitting diodes (LEDs) disposed at a printed circuit board assembly (PCBA) of the illumination module are hidden from view when aligned with apertures of a reflector of the illumination module.
Figure 6:
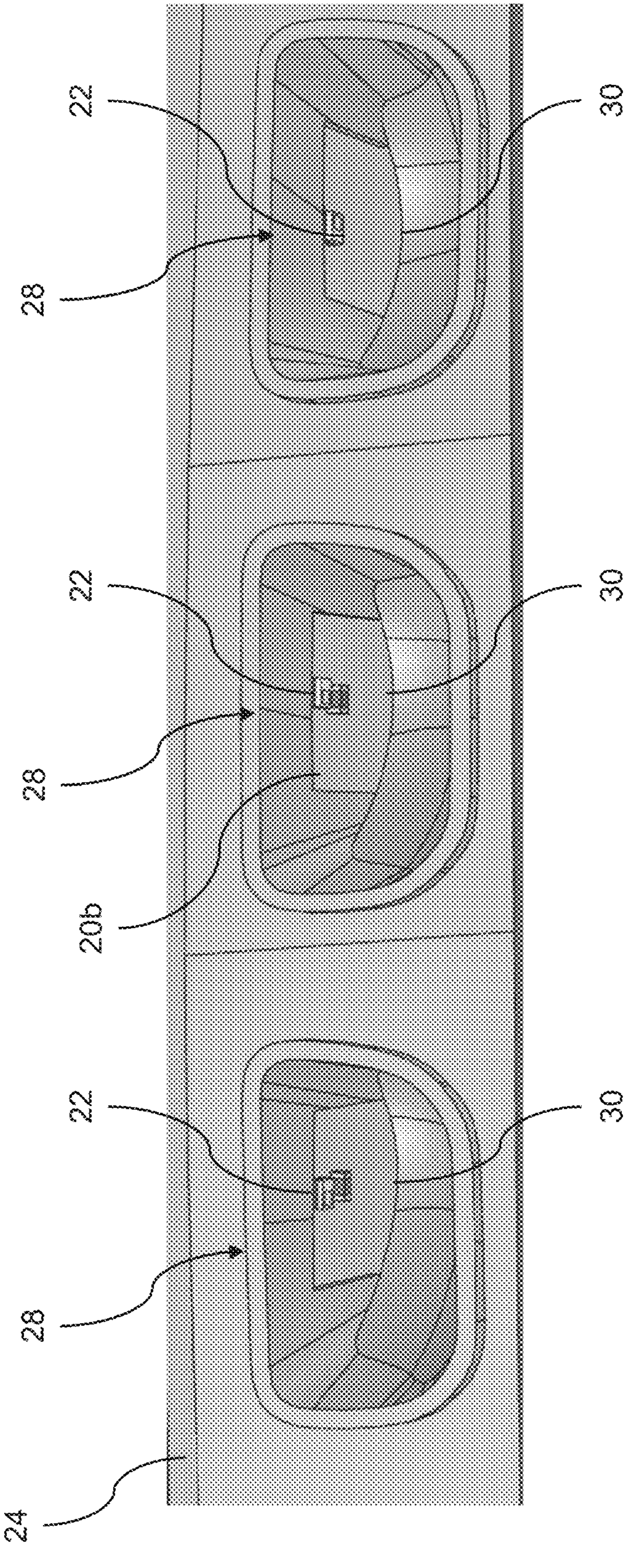
FIGS. 6 and 7 are perspective views of the reflector and PCBA of the illumination module, showing alignment of the LEDs with respective optic portions of the reflector.
Figure 7:
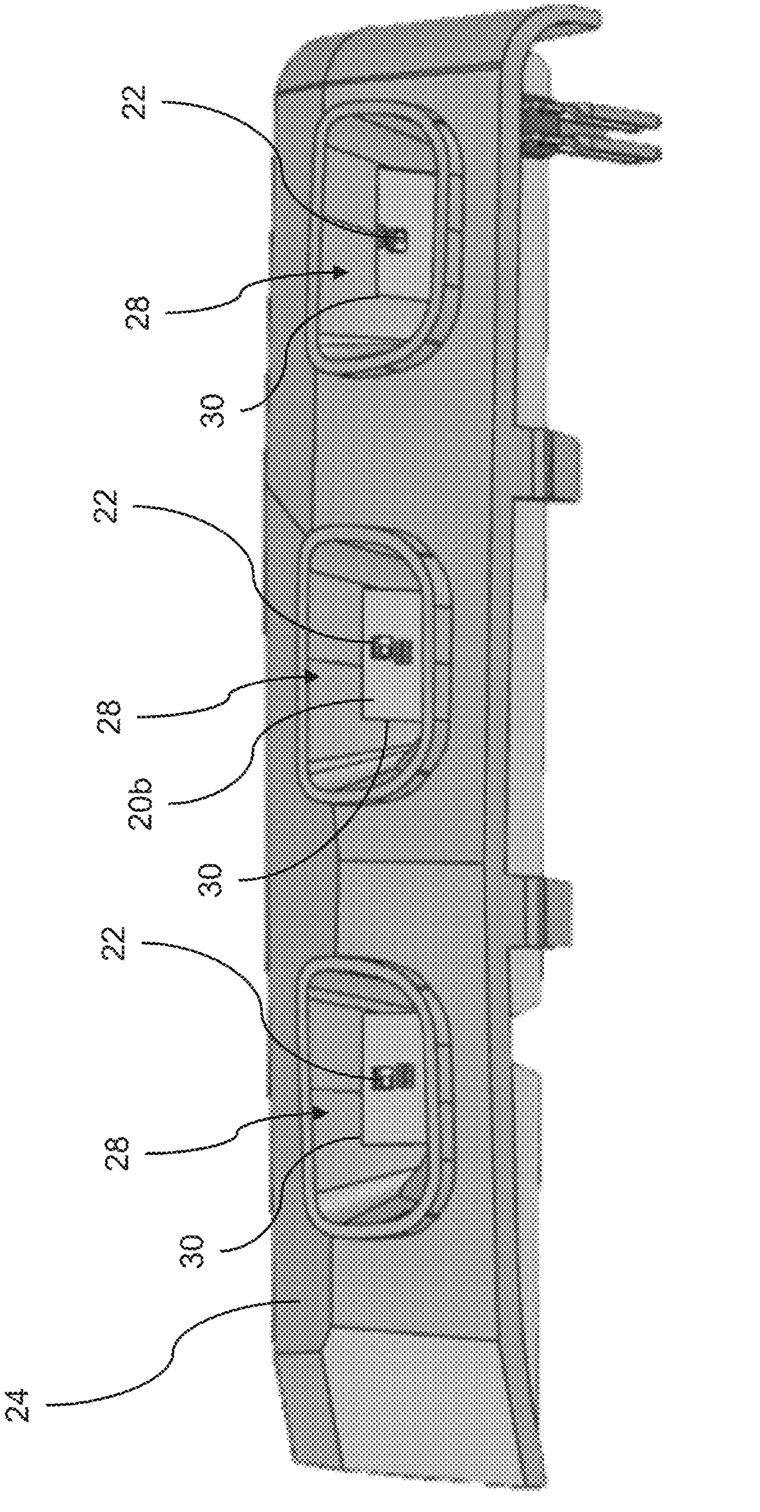
Figure 8:
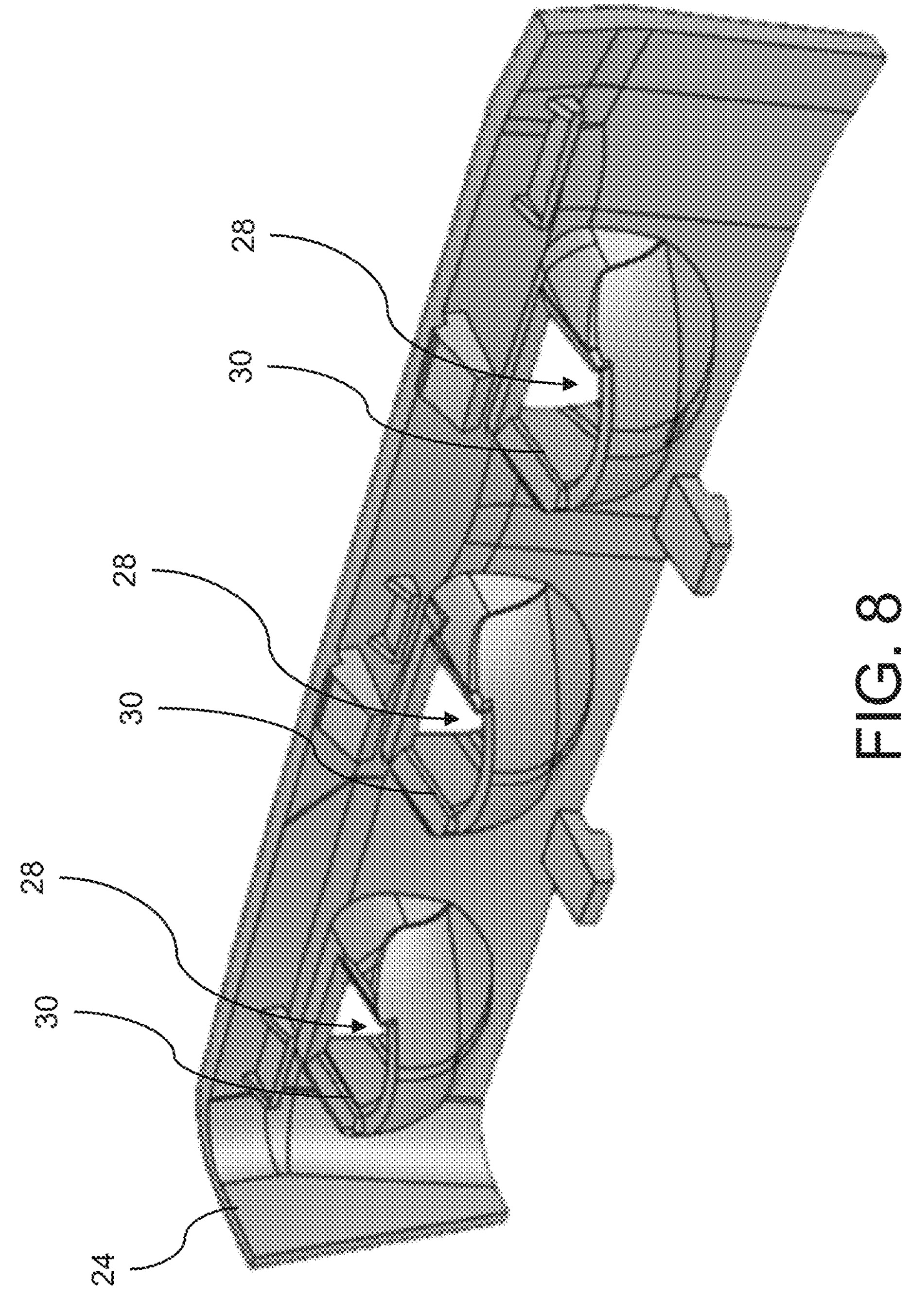
FIG. 8 is a perspective view of the reflector of the illumination module.
Figure 9:
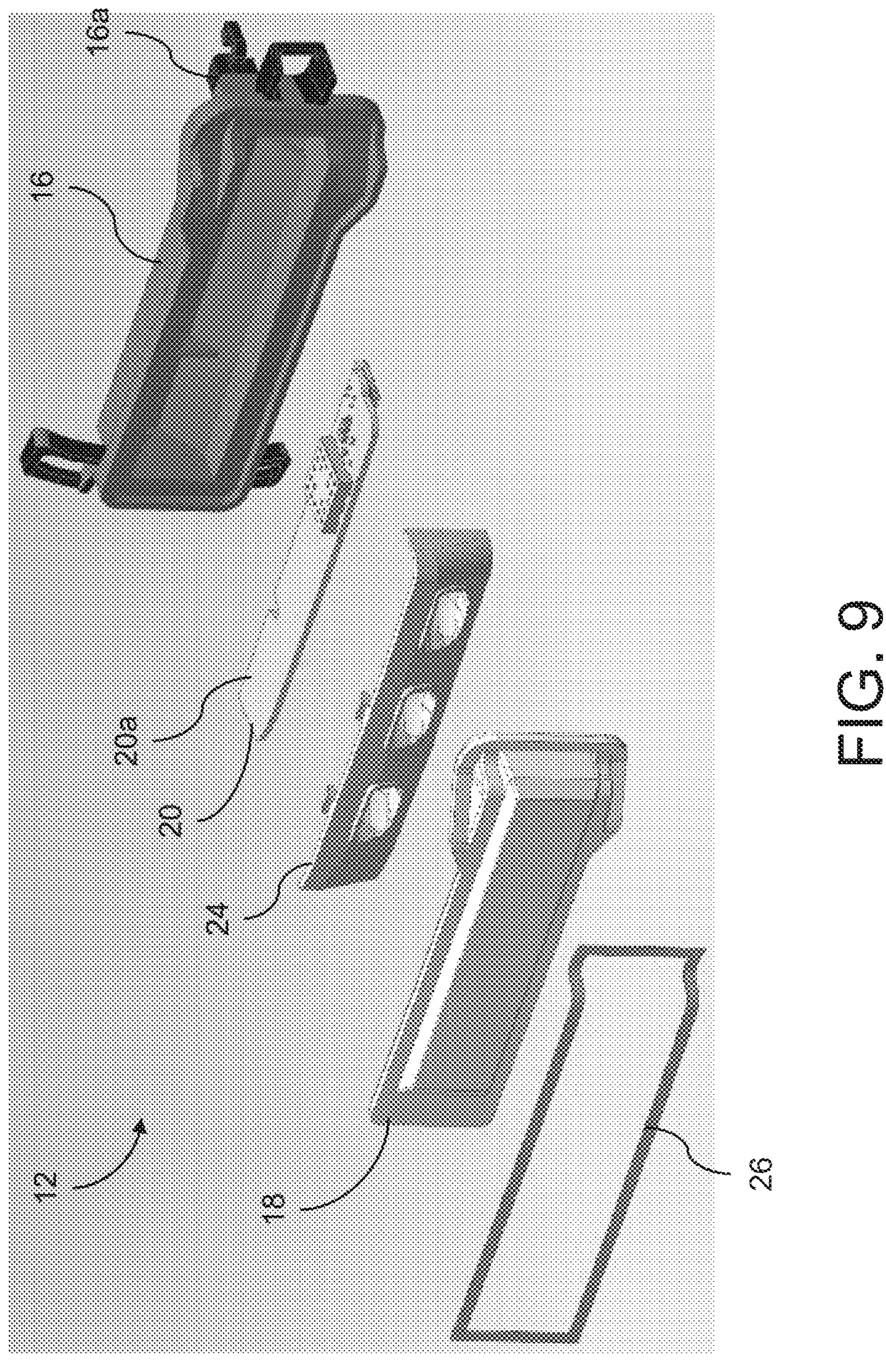
FIG. 9 is an exploded view of the illumination module.

As shown in FIGS. 6 and 7, each LED 22 is positioned relative to a respective optic portion 28 of the reflector 24 so that the optic portions 28 may reflect and shape light emitted by the LEDs 22 to be directed through the lens 18 and onto the surface at or near the vehicle 10. For example, the LEDs 22 are aligned with respective apertures 30 at a surface of the recessed optic portions 28. The LEDs 22 emit light that passes through the apertures 30 and that is reflected by surfaces of the optic portions 28 to be directed through the lens 18. With the PCBA 20 disposed at the upper portion of the casing 16 and the LEDs 22 at the lower surface 20*b* of the PCBA 20, the LEDs 22 may be aligned with the apertures 30 at an upper portion or surface of the optic portions 28. The LEDs 22 emit light in a generally downward direction toward the optic portions 28 and the optic portions 28 reflect the emitted light in a forward and/or sideward direction so that the light passes through the lens 18 in the desired illumination pattern. Optionally, the PCBA may be horizontally oriented and disposed at a lower portion of the casing with the LEDs at the upper surface of the PCBA to emit light in a generally upward direction through apertures at lower surfaces or portions of the optic portions. Because the LEDs 22 are disposed behind or within or at least partially recessed into the apertures 30, the reflector 24 helps to hide or tuck away the LEDs 22 and decrease direct visibility of the LEDs 22 to an observer viewing the illumination module 12 (FIG. 5).

The optic portions 28 may utilize freeform optics to shape and redirect the emitted light. That is, the optic portions 28 may have asymmetrical and complex shapes so that light incident at the optic portions 28 is directed or reflected in a desired direction and configuration. For example, the optic portions 28 may cooperate to shape and redirect the light emitted by the respective LEDs 22 to form a graphic icon (e.g., a logo) or a field of illumination of the illumination module 12 (e.g., a circular or oval field of illumination, a square or rectangular field of illumination, and the like). The freeform optic portions may utilize characteristics of the freeform reflective elements described in U.S. Pat. Nos. 8,914,437 and/or 11,235,699, which are hereby incorporated herein by reference in their entirety.

As shown in FIGS. 2 and 3, the reflector 24 may be configured to direct light emitted by the LEDs 22 to illuminate a vertical plane 11 that is 10 feet or 3.048 meters from the exterior rearview mirror assembly 14 and that has a width of at least 100 inches or 2.54 meters and a height of at least 100 inches or 2.54 meters. The illumination target or plane 11 may be oriented horizontally parallel to and centered along an axis normal to the PCBA 20. The height or vertical dimension of the target 11 may be measured from a ground plane or surface.

To achieve illumination of the plane, each optic portion 28 may be differently angled or oriented (i.e., have differently shaped or contoured surfaces) to reflect light and illuminate a different portion of the plane. For example, a first LED and first optic portion at a first side of the reflector 24 may direct light to illuminate a first side portion of the plane, a second LED and second optic portion at a central portion of the reflector 24 may direct light to illuminate a central portion of the plane, and a third LED and third optic portion at a second side of the reflector 24 may direct light to illuminate a second side portion of the plane. The fields of illumination provided by the respective LEDs may at least partially overlap with one another. Accordingly, the illumination module 12, when electrically operated, may achieve substantially even illumination of surfaces across the illumination plane 11. For example, when measuring luminous intensity at surfaces or objects, the target area 11 can be translated onto the surfaces or objects by sweeping 45 degrees horizontally and vertically, centered on the axis normal to the PCBA 20 (FIG. 3). While powered at a voltage of 12.8 volts, the minimum illuminance of any test point within the target area 11 (e.g., test points A-E in FIG. 3) may be at least 5 lux. Although shown as having a single row of LEDs and optic portions, the illumination module may include any suitable array of LEDs and optic portions for illuminating any desired shape or size plane or graphic icon, such as a three by three grid of LEDs and optic portions.

Thus, the illumination module 12 provides a light source at the exterior portion of the vehicle where the PCBA 20 is oriented horizontally (e.g., perpendicular to a primary axis of illumination of the illumination module) and utilizes a reflector to illuminate a target plane so that individual LEDs 22 are at least partially hidden from view of a pedestrian or driver of another vehicle viewing the illumination module 12. That is, the LEDs 22 may generate the field of illumination by emitting light toward the optic portions 28 of the reflector 24, which reflect or redirect the emitted light toward the lens 18 for illuminating the surface exterior the vehicle. This reduces hot spots and chance of dazzling pedestrians and/or drivers of other vehicles that view the illumination module 12 during operation while providing a more uniform field of illumination and/or higher resolution image or icon at the surface.

Further, the PCBA 20 may be configured to reduce thermal overload during operation and improve lifespan of the illumination module 12. For example, the PCBA 20 includes a buck and boost LED driver with the three LEDs 22 in parallel. The PCBA 20 utilizes integrated thermal rollback to protect the circuit under extreme temperature conditions. Moreover, the PCBA 20 implements an input protection circuit based on electromagnetic compatibility (EMC) and/or other electrical requirements of the application at the vehicle.

Operation of the illumination module 12 may be in response to a user input, such as based on actuation of a user actuatable input within the interior cabin of the vehicle, at a key fob of the vehicle, and the like. In some examples, a user actuatable input for controlling operation of the illumination module 12, such as a button or capacitive touch sensor, may be disposed at an exterior portion the vehicle 10 (e.g., at an outer surface of the exterior rearview mirror) Thus, a user may operate the illumination module 12 while outside of the vehicle, such as on a construction site or camp site.

Optionally, the illumination module 12 may be automatically operated to emit light, such as upon vehicle startup, based on detection of an object at or near the vehicle, and the like. For example, the illumination module 12 may be equipped at a police vehicle or security vehicle and operable to illuminate objects or pedestrians based on detection by an object detection system of the vehicle (such as via processing of image data captured by an exterior viewing camera by the object detection system of the vehicle). Similarly, the illumination module 12 may be equipped at a taxi vehicle or delivery vehicle and operable to illuminate a building facade or mailbox or address based on detection by the object detection system of the vehicle.

Optionally, the LEDs 22 may be selectably operated to adjust the field of illumination of the illumination module 12. For example, based on detection of the object within the field of illumination by the object detection system of the vehicle, the illumination module 12 may be operated to illuminate the detected object and the respective LEDs 22 may be energized or de-energized to adjust the field of illumination based on movement of the object relative to the vehicle. Further, the LEDs 22 may be individually operated to display or project a dynamic image or pattern onto the surface. For example, the LEDs may be sequentially energized to project a turn signal indicator moving across the surface according to the direction in which the vehicle is about to turn.

In some examples, a position or angle of the illumination module 12 relative to the vehicle 10 may be adjusted to adjust the field of illumination relative to the vehicle 10. For example, the illumination module 12 may be tilted or pivoted relative to the exterior rearview mirror assembly 14 and/or the exterior rearview mirror assembly 14 may be tilted or pivoted relative to the side of the vehicle 10 to adjust the direction of a primary axis of the field of illumination. That is, the primary axis of illumination may be adjusted laterally relative to the vehicle 10 (e.g., pivoted left and right in FIG. 2) and/or adjusted vertically relative to the vehicle (e.g., pivoted up and down in FIG. 3) based on movement of the illumination module 12 and/or the rearview mirror assembly 14. In some examples, the illumination module 12 may be disposed at an exterior rearview mirror assembly that includes an electrically operable actuator configured to rotate or pivot and/or tilt or adjust the mirror head of the mirror assembly relative to the side of the vehicle (such as to adjust a mirror reflective element of the mirror assembly to adjust the rearward view provided to the driver of the vehicle via the mirror reflective element). The actuator may also be operated to adjust the position of the mirror head to adjust illumination provided by the illumination module. The mirror assembly may utilize aspects of the mirror assemblies described in U.S. Publication Nos. US-2024-0367585 and/or US-2023-0009664, and/or U.S. Pat. Nos. 12,157,414; 12,071,074; 12,049,171; 11,597,321; 11,351,919; 11,325,535; 10,099,618; 9,827,913; 9,487,142; 9,346,403 and/or 8,915,601, which are all hereby incorporated herein by reference in their entireties.

Moreover, a film or mask, such as a colored film or mask, may be disposed at the illumination module 12, such as at the lens 18 or between the lens 18 and the reflector 24 so that operation of the illumination module 12 causes the LEDs 22 to illuminate a logo or design at the mask and project the logo or design onto the surface at or near the vehicle 10. In other words, the mask tints and/or attenuates specific spectral ranges of light emitted by the LEDs and passing through the lens 18 and mask so that the illumination module 12 projects the light onto the surface in the form of a desired color and/or image or logo. For example, the illumination module may utilize characteristics of the illumination modules described in U.S. Pub. No. US-2024-0367581, which are hereby incorporated herein by reference in their entireties.

During assembly of the illumination module 12, the PCBA 20 may be press-fit or snap attached or otherwise received within the housing 16, and the reflector 24 may be press-fit or snap attached to the PCBA 20 and/or the housing 16. The lens 18 may be attached to the housing 16, such as vibration welded to the housing 16, to seal the illumination module 12. That is, with the lens 18 welded to the housing 16 and the module 12 received at the exterior portion of the vehicle 10, the illumination module 12 may be watertight or sealed to preclude entrance of moisture or other contaminants that might cause damage.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or electroluminescent light sources or the like. The illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the vehicle side area depending on the particular application of the illumination module. For example, the illumination module may emit colored light that may match or correspond to the interior and/or exterior lighting of the particular vehicle to which the illumination module is mounted.

The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optical properties and the selected illumination module may be installed in the vehicle door handle and/or mirror assembly (or elsewhere on the vehicle, such as at or on or in the vehicle door or at or on or in a side panel of the vehicle or the like) to provide the customized or personalized illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,626,749; 7,255,451 and/or 7,289,037, which are hereby incorporated herein by reference in their entireties. Optionally, the illumination module may be disposed at an exterior rearview mirror assembly of the vehicle (such as at the housing of the mirror assembly or in the housing and behind the reflective element so as to be viewable through the reflective element) or the like, or may be disposed elsewhere at the exterior of the vehicle, such as at a door handle of the vehicle or the like. Optionally, the illumination module may be disposed at a lower region of the vehicle, such as at a lower region of a vehicle door, whereby the illumination module is activated to project the icon onto a ground region when the door is opened. Optionally, an illumination module with a backlit icon may be disposed at an interior portion of a vehicle, such as at an interior rearview mirror assembly (such as at a mirror casing or behind a reflective element and viewable through the reflective element or the like) of the vehicle or such as at or proximate to the interior door lock button or switch or the like. For example, the illumination module may be mounted at the interior rearview mirror assembly, an overhead console module or at the headliner of the vehicle and operate to project the icon onto an interior region or surface of the vehicle (such as the dashboard, center console, floor, and the like). The illumination module thus may provide a security indicator function at the interior rearview mirror assembly or elsewhere in the interior cabin of the vehicle.

Optionally, the cover and/or housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Thus, the present invention provides an illumination module at an exterior portion of the vehicle. Optionally, the illumination device or module of the present invention may be operable as an indicator to provide the driver with feedback as the driver or user or operator uses his or her key fob or as the passive or keyless entry system (PKE system) of the vehicle operates. Optionally, the illumination device or module may display vehicle logos or the like, and may use variable color LEDs that could be linked to an interior lighting system of the vehicle, such as to a MYCOLOR™ interior lighting system of the vehicle or the like.

The illumination module may be disposed at a mirror assembly where the mirror head is extendable and retractable relative to the side of the vehicle (e.g., to change a viewing angle or field of viewing for the driver of the vehicle, such as when the vehicle is towing a trailer). The mirror head may be extended or retracted to adjust the illumination provided by the illumination module. The extendable and retractable mirror assembly may utilize characteristics of the mirror assemblies described in U.S. Pat. Nos. 11,845,383 and/or 11,718,232, and/or U.S. Publication No. US-2023-0012333, and/or U.S. patent application Ser. No. 19/013,040, filed Jan. 8, 2025 and published on Jul. 10, 2025 as U.S. Publication No. US-2025-0222867, and/or U.S. provisional application Ser. No. 63/648,899, filed May 17, 2024, and/or U.S. provisional application Ser. No. 63/710,908, filed Oct. 23, 2024, which are all hereby incorporated herein by reference in their entireties.

Although shown and described as being disposed at an exterior rearview mirror assembly and/or door handle and/or exterior portion of a vehicle for providing illumination at a side of a vehicle, it is envisioned that the light module of the present invention is suitable for other applications. For example, the light module may be disposed at an interior portion of a vehicle, such as at an interior rearview mirror assembly (such as at a mirror casing or behind a reflective element and viewable through the reflective element or the like) of the vehicle or the like, whereby actuation of the light module may provide broad illumination of the dashboard and/or instrument panel of the vehicle (generally beneath the mirror assembly), and may project a beam of light to illuminate (such as at a greater intensity of light as compared to the broad illumination) a targeted portion of the interior of the vehicle (such as for map reading or the like). Also, for example, the light module may be suitable for use in non-automotive lighting applications, such as residential lighting or commercial lighting or the like. For example, a light module of the present invention may be converted to replace a household or residential or commercial business or office building light bulb, whereby the light module may provide normal lighting (that broadly illuminates the area surrounding the light module) in addition to projection lighting, such as in a similar manner as described above.

Changes and modifications in the specifically described embodiments may be carried out without departing from the principles of the present invention, which is intended to be limited only by the scope of the appended claims as interpreted according to the principles of patent law.

The invention claimed is:

1. A vehicular illumination module, the vehicular illumination module comprising:

a housing configured to be disposed at an exterior portion of a vehicle equipped with the vehicular illumination module;

a printed circuit board (PCB) accommodated by the housing, wherein the printed circuit board (PCB) comprises a first side and a second side opposite the first side and separated from the first side by a thickness of the printed circuit board (PCB);

wherein, with the housing disposed at the exterior portion of the vehicle, the first side of the printed circuit board (PCB) faces a first direction and the second side of the printed circuit board (PCB) faces a second direction opposite the first direction;

wherein the printed circuit board (PCB) comprises a light source disposed at the second side of the printed circuit board (PCB), and wherein the light source is electrically operable to emit light in the second direction;

a reflector accommodated by the housing, wherein the reflector comprises an optic portion, and wherein the optic portion comprises a freeform curvature, and wherein the housing has an aperture at the optic portion;

wherein, with the housing disposed at the exterior portion of the vehicle, and when the light source is electrically operated to emit light, the light source emits light that passes through the aperture such that the optic portion of the reflector reflects the light emitted by the light source to illuminate a region exterior of the vehicle, and wherein a primary axis of illumination of the light reflected by the optic portion is in a third direction transverse to the first direction and the second direction; and wherein, with the housing disposed at the exterior portion of the vehicle, and for a vertical surface situated at a distance of 10 feet from the vehicular illumination module, and when the vehicular illumination module is electrically operated, light emitted by the light source illuminates the vertical surface with illumination that spans a vertical height of at least 2.5 meters and a horizontal width of at least 2.5 meters.

2. The vehicular illumination module of claim 1, wherein the exterior portion of the vehicle comprises a vehicular exterior rearview mirror assembly of the vehicle.

3. The vehicular illumination module of claim 2, wherein, with the housing disposed at a mirror housing of the vehicular exterior rearview mirror assembly of the vehicle, an actuator of the vehicular exterior rearview mirror assembly of the vehicle is electrically operable to adjust the mirror housing relative to the vehicle to adjust the primary axis of illumination of the light relative to the vehicle.

4. The vehicular illumination module of claim 2, wherein, with the housing disposed at the vehicular exterior rearview mirror assembly of the vehicle, the second side of the printed circuit board (PCB) faces downward, and wherein, when the light source is electrically operated to emit light, light emitted downward reflects off the optic portion of the reflector to illuminate a region forward of the vehicle.

5. The vehicular illumination module of claim 1, wherein, with the housing disposed at the exterior portion of the vehicle, the first direction is vertically upward and the second direction is vertically downward.

6. The vehicular illumination module of claim 1, wherein, with the housing disposed at the exterior portion of the vehicle, and for the vertical surface situated at a distance of 10 feet from the vehicular illumination module, and when the vehicular illumination module is electrically operated to emit light, illumination at the vertical surface comprises illuminance of at least 5 lux.

7. The vehicular illumination module of claim 1, wherein the light source comprises a plurality of light sources and the reflector comprises a plurality of optic portions, and wherein, with the housing disposed at the exterior portion of the vehicle, and when the plurality of light sources are electrically operated to emit light, each optic portion of the plurality of optic portions reflects light emitted by one corresponding light source of the plurality of light sources, and wherein reflection by each optic portion of the plurality of optic portions of the light emitted by the plurality of light sources cooperates to illuminate the region exterior of the vehicle.

8. The vehicular illumination module of claim 7, wherein each optic portion of the plurality of optic portions comprises a unique freeform curvature.

9. The vehicular illumination module of claim 7, wherein each light source of the plurality of light sources is accommodated by a common circuit element.

10. The vehicular illumination module of claim 7, wherein the exterior portion of the vehicle comprises a vehicular exterior rearview mirror assembly of the vehicle, and wherein, with the housing disposed at the vehicular exterior rearview mirror assembly of the vehicle, the second side of the printed circuit board (PCB) faces downward, and wherein, when the light sources are electrically operated to emit light, light emitted downward reflects off the respective optic portions of the reflector to illuminate a region forward of the vehicle.

11. The vehicular illumination module of claim 7, wherein each light source of the plurality of light sources comprises a light emitting diode.

12. The vehicular illumination module of claim 1, wherein the light source comprises at least one light emitting diode.

13. The vehicular illumination module of claim 1, wherein the housing comprises an outer cover, and wherein, with the housing disposed at the exterior portion of the vehicle, the emitted light reflected by the optic portion of the reflector passes through the outer cover to illuminate the region exterior of the vehicle.

14. The vehicular illumination module of claim 13, wherein, with the housing disposed at the exterior portion of the vehicle, the outer cover corresponds to an outer surface of the exterior portion of the vehicle.

15. A vehicular exterior rearview mirror assembly, the vehicular exterior rearview mirror assembly comprising:

a mirror head disposed at mounting structure, wherein the mounting structure is configured to mount the vehicular exterior rearview mirror assembly at a side of a vehicle;

wherein the mirror head comprises a mirror reflective element;

wherein, with the vehicular exterior rearview mirror assembly mounted at the side of the vehicle, the mirror reflective element provides a rearward view at the side of the vehicle to a driver of the vehicle;

wherein the mirror head accommodates an illumination module;

wherein the illumination module comprises (i) a housing and (ii) a printed circuit board (PCB) accommodated by the housing, and wherein the printed circuit board (PCB) comprises a first side and a second side opposite the first side and separated from the first side by a thickness of the printed circuit board (PCB);

wherein, with the vehicular exterior rearview mirror assembly mounted at the side of the vehicle, the first side of the printed circuit board (PCB) faces a first direction and the second side of the printed circuit board (PCB) faces a second direction opposite the first direction;

wherein the printed circuit board (PCB) comprises a light source disposed at the second side of the printed circuit board (PCB), and wherein the light source is electrically operable to emit light in the second direction;

a reflector accommodated by the housing, wherein the reflector comprises an optic portion, and wherein the optic portion comprises a freeform curvature, and wherein the housing has an aperture at the optic portion;

wherein, with the vehicular exterior rearview mirror assembly mounted at the side of the vehicle, and when the light source is electrically operated to emit light, the light source emits light that passes through the aperture such that the optic portion of the reflector reflects the light emitted by the light source to illuminate a region exterior of the vehicle, and wherein a primary axis of illumination of the light reflected by the optic portion is in a third direction transverse to the first direction and the second direction; and wherein, with the housing disposed at the side of the vehicle, and for a vertical surface situated at a distance of 10 feet from the illumination module, and when the illumination module is electrically operated, light emitted by the light source illuminates the vertical surface with illumination that spans a vertical height of at least 2.5 meters and a horizontal width of at least 2.5 meters.

16. The vehicular exterior rearview mirror assembly of claim 15, wherein an actuator is accommodated within the mirror head, and wherein, with the vehicular exterior rearview mirror assembly mounted at the side of the vehicle, the actuator is electrically operable to adjust the mirror head relative to the mounting structure to adjust the primary axis of illumination of the light relative to the vehicle.

17. The vehicular exterior rearview mirror assembly of claim 15, wherein, with the vehicular exterior rearview mirror assembly mounted at the side of the vehicle, the second side of the printed circuit board (PCB) faces downward, and wherein, when the light source is electrically operated to emit light, light emitted downward reflects off the optic portion of the reflector to illuminate a region forward of the vehicle.

18. The vehicular exterior rearview mirror assembly of claim 15, wherein the light source comprises a plurality of light sources and the reflector comprises a plurality of optic portions, and wherein, with the vehicular exterior rearview mirror assembly mounted at the side of the vehicle, and when the plurality of light sources are electrically operated to emit light, each optic portion of the plurality of optic portions reflects light emitted by one corresponding light source of the plurality of light sources, and wherein reflection by each optic portion of the plurality of optic portions of the light emitted by the plurality of light sources cooperates to illuminate the region exterior of the vehicle.

19. A vehicular exterior rearview mirror assembly, the vehicular exterior rearview mirror assembly comprising:

a mirror head disposed at mounting structure, wherein the mounting structure is configured to mount the vehicular exterior rearview mirror assembly at a side of a vehicle;

wherein the mirror head comprises a mirror reflective element;

wherein, with the vehicular exterior rearview mirror assembly mounted at the side of the vehicle, the mirror reflective element provides a rearward view at the side of the vehicle to a driver of the vehicle;

an actuator accommodated within the mirror head, wherein, with the vehicular exterior rearview mirror assembly mounted at the side of the vehicle, the actuator is electrically operable to adjust the mirror head relative to the mounting structure to adjust the rearward view for the driver of the vehicle;

wherein the mirror head accommodates an illumination module;

wherein the illumination module comprises (i) a housing and (ii) a printed circuit board (PCB) accommodated by the housing, and wherein the printed circuit board (PCB) comprises a first side and a second side opposite the first side and separated from the first side by a thickness of the printed circuit board (PCB);

wherein, with the vehicular exterior rearview mirror assembly mounted at the side of the vehicle, the first side of the printed circuit board (PCB) faces a first direction and the second side of the printed circuit board (PCB) faces a second direction opposite the first direction;

wherein the printed circuit board (PCB) comprises a light source disposed at the second side of the printed circuit board (PCB), and wherein the light source is electrically operable to emit light in the second direction;

a reflector accommodated by the housing, wherein the reflector comprises an optic portion, and wherein the optic portion comprises a freeform curvature, and wherein the housing has an aperture at the optic portion;

wherein, with the vehicular exterior rearview mirror assembly mounted at the side of the vehicle, and when the light source is electrically operated to emit light, the light source emits light that passes through the aperture such that the optic portion of the reflector reflects the light emitted by the light source to illuminate a region exterior of the vehicle, and wherein a primary axis of illumination of the light reflected by the optic portion is in a third direction transverse to the first direction and the second direction;

wherein the housing comprises an outer cover, and wherein, with the vehicular exterior rearview mirror assembly mounted at the side of the vehicle, the emitted light reflected by the optic portion of the reflector passes through the outer cover to illuminate the region exterior of the vehicle;

wherein, with the vehicular exterior rearview mirror assembly mounted at the side of the vehicle, the actuator is electrically operable to adjust the mirror head relative to the mounting structure to adjust the primary axis of illumination of the light relative to the vehicle; and wherein, with the housing disposed at the side of the vehicle, and for a vertical surface situated at a distance of 10 feet from the illumination module, and when the illumination module is electrically operated, light emitted by the light source illuminates the vertical surface with illumination that spans a vertical height of at least 2.5 meters and a horizontal width of at least 2.5 meters.

20. The vehicular exterior rearview mirror assembly of claim 19, wherein, with the vehicular exterior rearview mirror assembly mounted at the side of the vehicle, the second side of the printed circuit board (PCB) faces downward, and wherein, when the light source is electrically operated to emit light, light emitted downward reflects off the optic portion of the reflector to illuminate a region forward of the vehicle.

21. The vehicular exterior rearview mirror assembly of claim 19, wherein the light source comprises a plurality of light sources and the reflector comprises a plurality of optic portions, and wherein, with the vehicular exterior rearview mirror assembly mounted at the side of the vehicle, and when the plurality of light sources are electrically operated to emit light, each optic portion of the plurality of optic portions reflects light emitted by one corresponding light source of the plurality of light sources, and wherein reflection by each optic portion of the plurality of optic portions of the light emitted by the plurality of light sources cooperates to illuminate the region exterior of the vehicle.

22. The vehicular exterior rearview mirror assembly of claim 19, wherein the outer cover corresponds to an outer surface of the housing.

* * * * *